United States Patent
Wharton et al.

(10) Patent No.: US 10,225,002 B2
(45) Date of Patent: Mar. 5, 2019

(54) SATELLITE SYSTEM WITH ROLLING WAVE HANDOVERS

(71) Applicant: Space Systems/Loral, LLC, Palo Alto, CA (US)

(72) Inventors: Anne E. Wharton, Boulder Creek, CA (US); Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 167 days.

(21) Appl. No.: 15/218,009

(22) Filed: Jul. 23, 2016

(65) Prior Publication Data
US 2018/0097561 A1    Apr. 5, 2018

(51) Int. Cl.
*H04B 7/185* (2006.01)
*H04B 7/204* (2006.01)
*H04W 36/14* (2009.01)
*H04W 84/06* (2009.01)

(52) U.S. Cl.
CPC ..... *H04B 7/18541* (2013.01); *H04B 7/18523* (2013.01); *H04B 7/18584* (2013.01); *H04B 7/2041* (2013.01); *H04W 36/14* (2013.01); *H04W 84/06* (2013.01)

(58) Field of Classification Search
CPC ............ H04B 7/18541; H04B 7/18523; H04B 7/18584; H04B 7/2041; H04W 36/14; H04W 84/06

USPC ......................................................... 455/428
See application file for complete search history.

(56) References Cited

U.S. PATENT DOCUMENTS

| | | | | |
|---|---|---|---|---|
| 5,584,046 A * | 12/1996 | Martinez | ............ | H04B 7/18513 370/324 |
| 6,321,088 B1 * | 11/2001 | Dempo | .............. | H04B 7/18541 370/331 |
| 6,512,920 B1 * | 1/2003 | Yaoya | ................ | H04B 7/18541 455/428 |
| 6,553,226 B1 * | 4/2003 | Watson | .............. | H04B 7/18521 370/316 |
| 6,868,316 B1 * | 3/2005 | Stevens | ................ | G05D 1/0883 244/171 |
| 2001/0045494 A1 * | 11/2001 | Higgins | ............... | B64G 1/1007 244/158.4 |
| 2004/0092263 A1 * | 5/2004 | Parkman | ............ | H04B 7/18508 455/436 |
| 2011/0169688 A1 * | 7/2011 | Wyler | .................... | H04B 7/195 342/354 |
| 2014/0105100 A1 * | 4/2014 | Tronc | ................. | H04B 7/18513 370/321 |
| 2015/0158602 A1 * | 6/2015 | Marshack | ............ | B64G 1/1085 244/158.4 |

* cited by examiner

*Primary Examiner* — Mong-Thuy T Tran
(74) *Attorney, Agent, or Firm* — Vierra Magen Marcus LLP (57) ABSTRACT

A constellation of non-geosynchronous satellites are in a common orbit. Each time one of the satellites is at a trigger location, a new rolling wave of handovers is started that includes performing handovers of a group of dependent spot beams between adjacent satellites in sequence for pairs of adjacent satellites in a single direction around the orbit.

19 Claims, 9 Drawing Sheets

SATELLITE SYSTEM WITH ROLLING WAVE HANDOVERS

BACKGROUND

The present disclosure relates to technology for satellite communication systems.

Satellite communication systems typically include one or more satellites and a set of ground terminals. Such systems typically operate within regulations that allocate operating frequency bandwidth for a particular communications service and specify, among other things, a maximum signal power spectral density of communications signals radiated to the ground. A growing market exists for provision of high data rate communication services to individual consumers and small businesses which may be underserved by or unable to afford conventional terrestrial services. Satellite communication systems have been proposed to provide such high data rate communication services. However, designing a satellite system to meet these needs is challenging.

DETAILED DESCRIPTION

To provide high capacity and high data rate communication services via satellite to a large group of people, a satellite system is proposed that comprises a constellation of non-geostationary satellites orbiting the Earth in a common orbit that is divided into zones. The satellites comprise a group of steerable beams that can be used, while in a particular zone, to point to ground locations associated that particular zone. As the satellites move in orbit, the beams will track the ground locations until the satellites have moved too far and must hand over the beams to the next satellite. To make most efficient use of satellite resources, a rolling wave handover process is proposed. Each time one of the satellites is at a trigger location (e.g., the start of the first zone), a new rolling wave of handovers is started that includes performing handovers of a group of dependent spot beams between adjacent satellites in sequence for pairs of adjacent satellites in a single direction around the orbit. In one example embodiment, the satellites are assumed to move eastward around Earth.

Dependent beams on one satellite are handed over to the next western satellite or the nearest satellite in the direction opposite to orbital motion, freeing antennas on the eastern satellite to overlap and add beams from its next eastern neighbor. This propagates around the globe to the next western satellite until the first satellite reaches the satellite Nadir position of the first satellite, and the handover rolling wave starts again. For a simple rolling wave for the constellation, all steerable beams on a satellite are treated as dependent and handed over together. In other embodiments, subsets of steerable beams are treated as dependent and handed over together. For the case of smaller dependent groups of beams, these can be handed over separately as long as antennas are available and can be scheduled on surrounding satellites to support independent handover of a group of satellites. This would result in multiple independent rolling waves and/or rippling waves that last for potentially shorter periods until antennas are required for the larger group.

Figure 1:
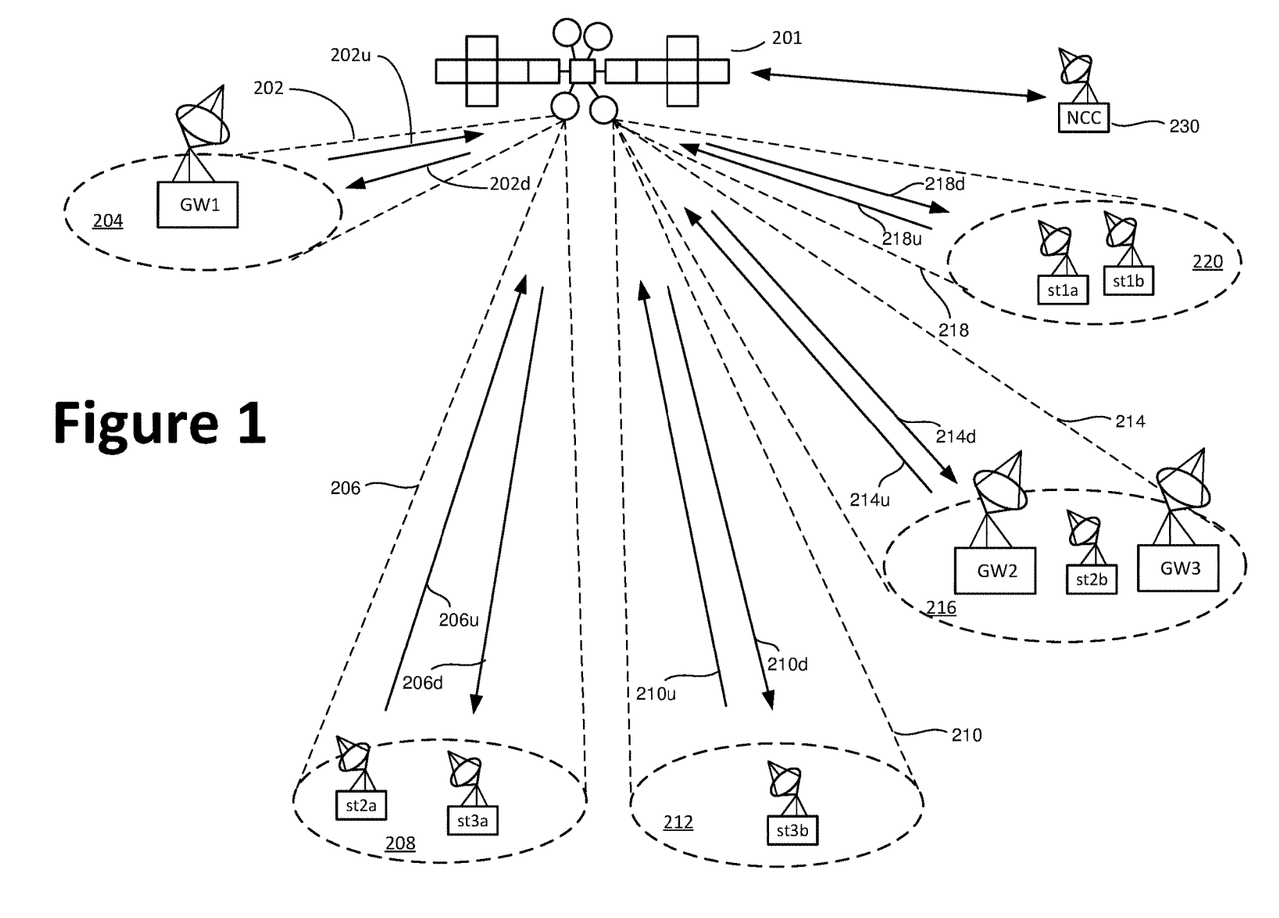
FIG. 1 is a block diagram describing one embodiment of a portion of a satellite communications system.

FIG. 1 is a block diagram depicting a portion of a satellite communications system that includes one or more satellites. FIG. 1 depicts satellite 201, which is a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments (as described below) the system will include multiple satellites that are referred to as a constellation of satellites.

In one embodiment, satellite 201 comprises a bus (i.e., spacecraft) and one or more payloads, including a communications payload. The communication payload may include a digital channelizer for routing communication between spot beams of the satellite. The satellite may also include multiple power sources, such as batteries, solar panels, and one or more propulsion systems, for operating the bus and the payload. The satellite includes an antenna system that provides a plurality of beams, including non-articulated and steerable spot beams, for communicating with subscriber terminals and gateways.

A subscriber terminal is a device that wirelessly communicates with a satellite, usually to be used by one or more end users. The term subscriber terminal may be used to refer to a single subscriber terminal or multiple subscriber terminals. A subscriber terminal is adapted for communication with the satellite communication system including satellite 201. Subscriber terminals may include fixed and mobile subscriber terminals including, but not limited to, a cellular telephone, wireless handset, a wireless modem, a data transceiver, a paging or position determination receiver, or mobile radiotelephone, a cellular backhaul, a trunk, an enterprise computing or storage device, an airborne device, a maritime device or a head end of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, a terminal or a mobile. In some cases, terminals may communicate directly with one another over satellite without communicating through a gateway or hub.

The term gateway may be used to refer to a device that communicates wirelessly with a satellite and provides an interface to a network, such as the Internet, a wide area network, a telephone network or other type of network. In some embodiments, gateways manage the subscriber terminals. Rather than gateways, or in addition to gateways, a satellite communication system can include a hub which can communicate with many subscriber terminals via satellite 201 and manage communication between subscriber terminals via the hub.

FIG. 1 also shows a Network Control Center 230, which includes an antenna and modem for communicating with satellite 201, as well as one or more processors and data storage units. Network Control Center 230 provides commands to control and operate satellite communication payload 201, as well as all other satellite communication payloads in the constellation. Network Control Center 230 may also provide commands to any of the gateways (via a satellite or a terrestrial network) and/or subscriber terminals.

In one embodiment, satellite 201 is configured to provide sixteen steerable spot beams. In other embodiments, satellite 201 includes fixed (non-steerable or non-articulated) spot beams in addition to (or instead of) the steerable spot beams. Typical approaches for beam steering are: mechanical steering, electrically steering or steering by reorienting the entire body of the satellite. With mechanical steering, the antenna is moved by means of a motor. For example, a reflector can be rotated or have its orientation adjusted. With electrically steering, in azimuth and in elevation, the scan is performed electronically. This approach doesn't require mechanical rotation. These characteristics facilitate a reduction in the size and the "height" of the antenna that is important in airborne applications, and facilitate a better reliability factor than a mechanical approach due to the lack of mechanical parts. One example of electrical steering of a spot beam is by using phased arrays. Beam steering by reorienting the entire body of the satellite includes using reaction wheels, momentum wheels (or other means) on the satellite to change the orientation of the satellite so that the spot beams point to a different location on Earth.

For example purposes only, FIG. 1 shows five spot beams: 202, 206, 210, 214 and 218. Spot beam 202 is a steerable spot beam that illuminates coverage area 204 for communicating with one or more gateways GW1 via downlink 202d and uplink 202u. Spot beam 206 is a steerable dual-purpose beam that illuminates coverage area 208 in order to communicate with one or more subscriber terminals, such as subscriber terminals st2a and st3a, via downlink 206d and uplink 206u. Spot beam 210 is a steerable spot beam which illuminates coverage area 212 to communicate with subscriber terminals, such as subscriber terminal st3b, via downlink 210d and uplink 210u. Spot beam 214 illuminates coverage area 216 to communicate with gateways such as gateway GW2 and gateway GW3, as well as subscriber terminals, such as subscriber terminal st2b, via downlink 214d and uplink 214u. Spot beam 218 is a steerable dual purpose beam that illuminates coverage area 220 in order to communicate with one or more subscriber terminals, such as subscriber terminals st1a and st1b, via downlink 218d and uplink 218u. The depiction of gateways and subscriber terminals in the spot beams of FIG. 1 are for example purposes only and other groups of gateways and subscriber terminals in spot beams can be used. It is contemplated that a single spot beam can communicate with thousands of subscriber terminals.

In one example, gateway GW1 in spot beam 202 communicates and services (e.g., provides an interface to the Internet or other network/resource) subscriber terminals st1a and st1b in spot beam 202. Therefore, spot beams 202 and 218 are dependent on each other, so it is said that they form a group of dependent spot beams. In this example, gateway GW2 in spot beam 214 communicates and services subscriber terminal st2a in spot beam 206 and subscriber terminal st2b in spot beam 214. Therefore, spot beams 206 and 214 are dependent on each other, so it is said that they form a group of dependent spot beams. Gateway GW3 in spot beam 214 communicates and services subscriber terminal st3a in spot beam 206 and subscriber terminal st3b in spot beam 2110. Therefore, spot beams 206, 210 and 214 are dependent on each other, so it is said that they form a group of dependent spot beams. Sometimes a gateway can have a contractual obligation or economic desire to maintain services for its group of subscriber terminals. Therefore, in one embodiment, spot beams that are in a group of dependent spot beams are handed over together (simultaneously) or concurrently (the hand overs of the beams are overlapping in time).

Figure 2:
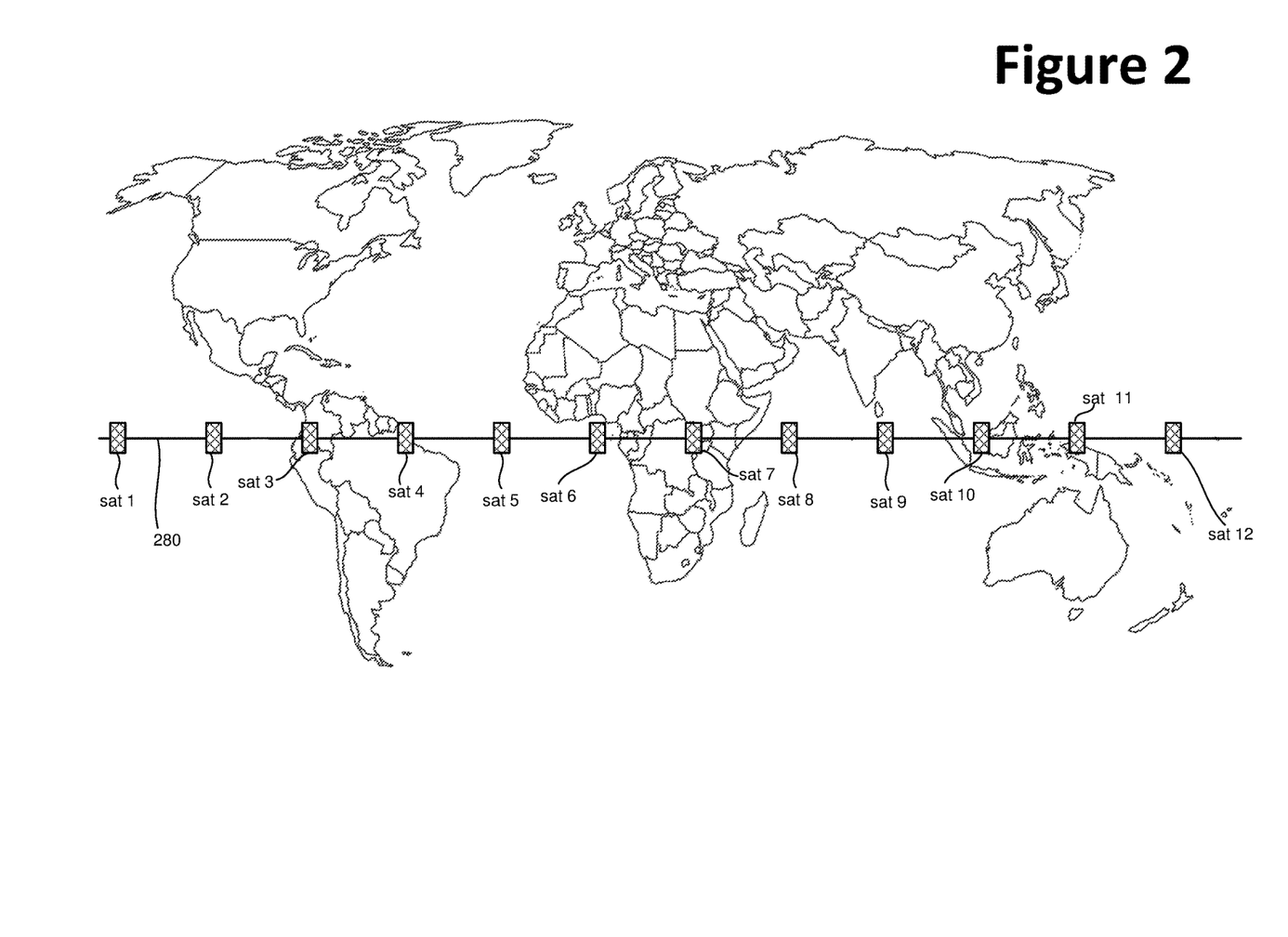
FIG. 2 is a map of the world, showing a constellation of non-geostationary satellites in a common orbit around the Earth.

In one embodiment, satellite 201 of FIG. 1 is only one satellite of a larger constellation of satellites that implement the satellite communication system. In one example embodiment, the satellite constellation includes twelve satellites, with each satellite having the same structure as satellite 201. However, in other embodiments each of the satellites can be different and/or the constellation of satellites can have more or less than twelve satellites. FIG. 2 is a map of the world showing twelve non-geostationary satellites sat 1, sat 2, sat 3, sat 4, sat 5, sat 6, sat 7, sat 8, sat 9, sat 10, sat 11, and sat 12. In one embodiment all twelve satellites of FIG. 2 are in an orbit about the Equator, where the orbit s depicted in FIG. 2 by line 280. In one example, all twelve satellites are moving in the same orbital direction (e.g., West to East) along the same orbital path (e.g., along line 280) and are equally spaced apart from each other. In other embodiments, the satellites may not be equally spaced apart and/or the spacecraft may not be heading eastward around the world but traveling in another common direction.

Figure 3:
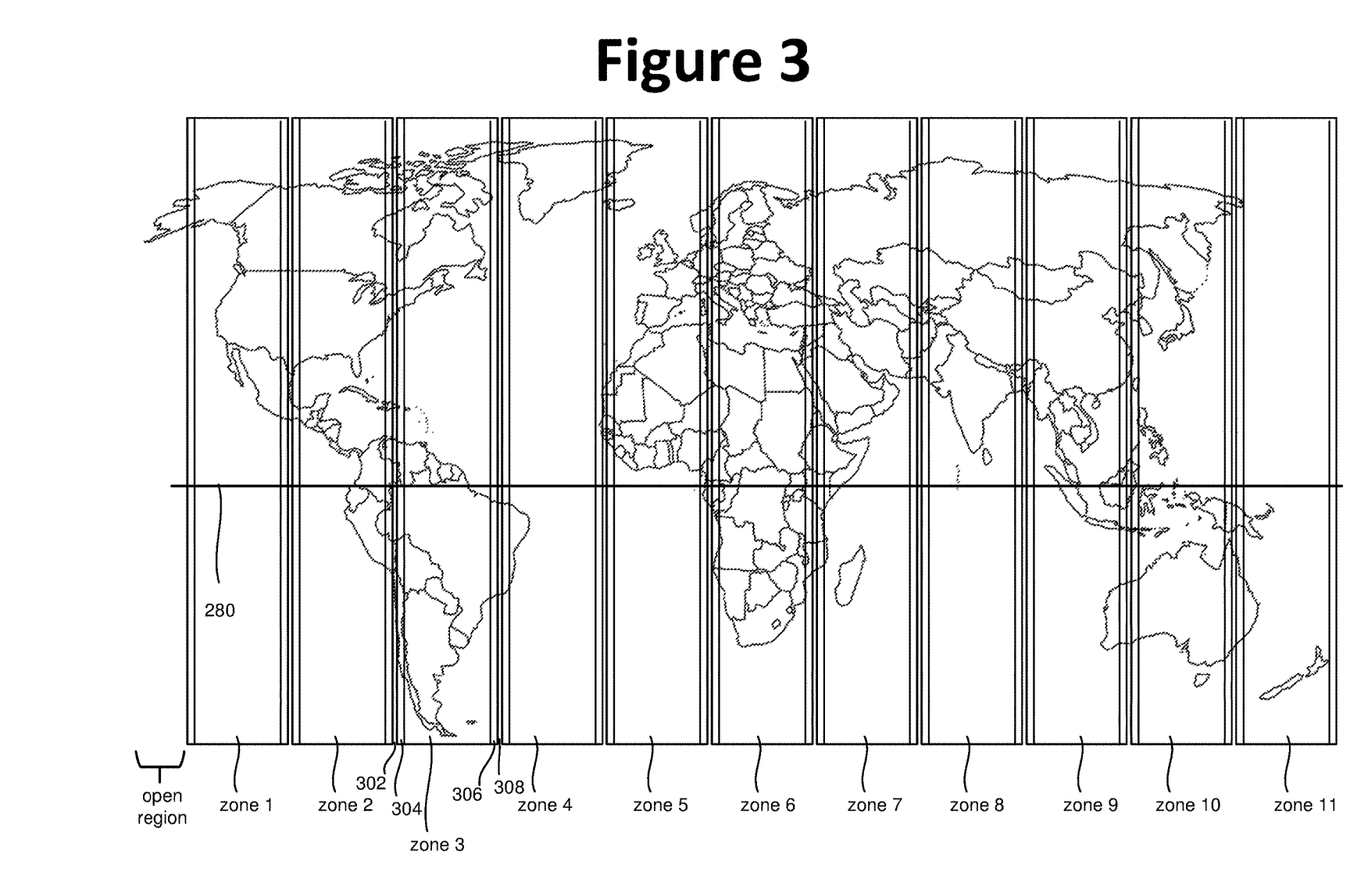
FIG. 3 depicts a map of the earth, showing how an orbit is divided into zones.

FIG. 3 is a map of the Earth, including line 280 representing the orbit of the twelve satellites in the constellation of non-geostationary satellites. In one embodiment, a system with N satellites will have the orbit broken up into N−1 zones. In example of FIG. 3, there are twelve satellites traversing the orbit 280, which is divided into eleven zones including zone 1, zone 2, zone 3, zone 4, zone 5, zone 6, zone 7, zone 8, zone 9, zone 10 and zone 11. In one embodiment, there is an "open region" depicted in the map. While FIG. 3 shows the open region between zone 11 and zone 1, the open region can be between other zones or can be distributed between many zones. A zone represents a portion of the orbit. Each zone is associated with a set of ground locations. A satellite is in a zone when its Nadir position is inside the zone. A Nadir position is a line from the satellite to the center of the Earth. When a satellite is in a particular zone, that satellite is in communication with ground locations associated with the zone. For example, ground locations associated with zone 5 can include the United Kingdom, Spain, Portugal, France and portions of Northwestern Africa. It is possible that a location associated with a zone might appear to be outside the zone because the zones relate to the position of the satellite.

In one embodiment, there are gaps between zones. For example, FIG. 3 labels gap 302 between zone 2 and zone 3 and gap 308 between zone 3 and zone 4. In one embodiment, each of the zones includes an entrance band and an exit band at edges of the zones. At the western entrance of a zone is the entrance band. The eastern boundary of the zone is the exit band. For example, FIG. 3 labels entrance band 304 of zone 3 and exit band 306 of zone 3. In one implementation, all of the zones will have entrance bands and exit bands; however, they are not all labeled in FIG. 3.

As the satellites move in orbit, the spot beams for a particular satellite will point to ground locations associated with the zone that that satellite is in. As the satellite moves in the zone, the beams will adjust their orientation in order to track the ground locations associated with that zone. When a satellite reaches the eastern edge of the zone, the satellite hands over its beams to a trailing adjacent satellite. For example, as satellite sat 3 leaves zone 3, it will perform a handover its beams to satellite sat 2. As a particular satellite enters a zone, it will accept handover of beams from a leading adjacent satellite. For example, as satellite sat 2 enters zone 6 it will accept a handover of beam from satellite sat 3.

To make most efficient use of each satellite's resources, and provide as much capacity to subscriber terminals on the ground, it is proposed that the constellations of satellites implement a rolling wave handover process. In one embodiment, each time one of the satellites reaches the entrance band of zone 1, or another trigger location, a new rolling wave of handovers is started. This concept is described by the flow chart of FIG. 4. In step 402 of FIG. 4, a plurality of non-geosynchronous satellites are provided in a common orbit. Each time one of the plurality of non-geosynchronous satellites is at a trigger location (e.g., edge of zone 1), a new rolling wave of handovers is started. The rolling wave includes performing handovers of a group of dependent spot beams between adjacent satellites, in sequence with pairs of adjacent satellites in a single direction around the orbit.

Figure 4:
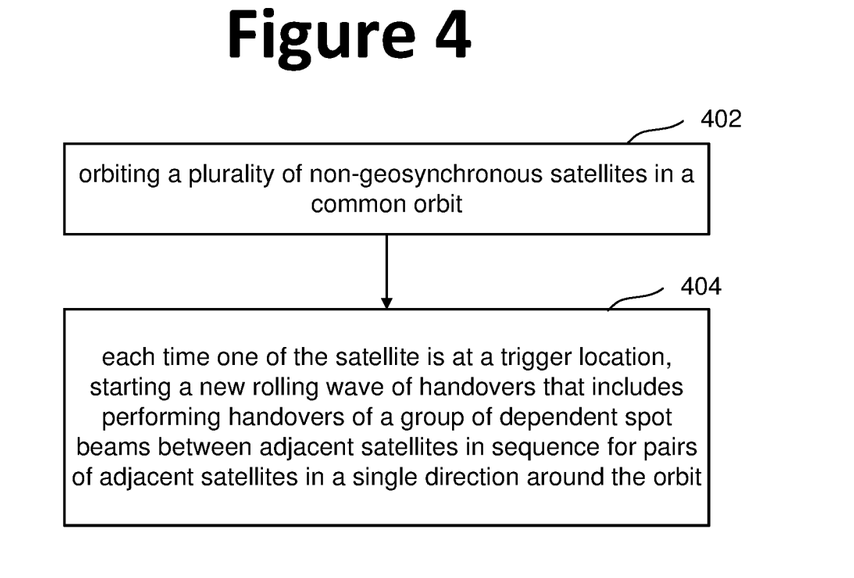
FIG. 4 is a flow chart describing one embodiment of a process for implementing a rolling wave of handovers between satellites.
Figure 5A:
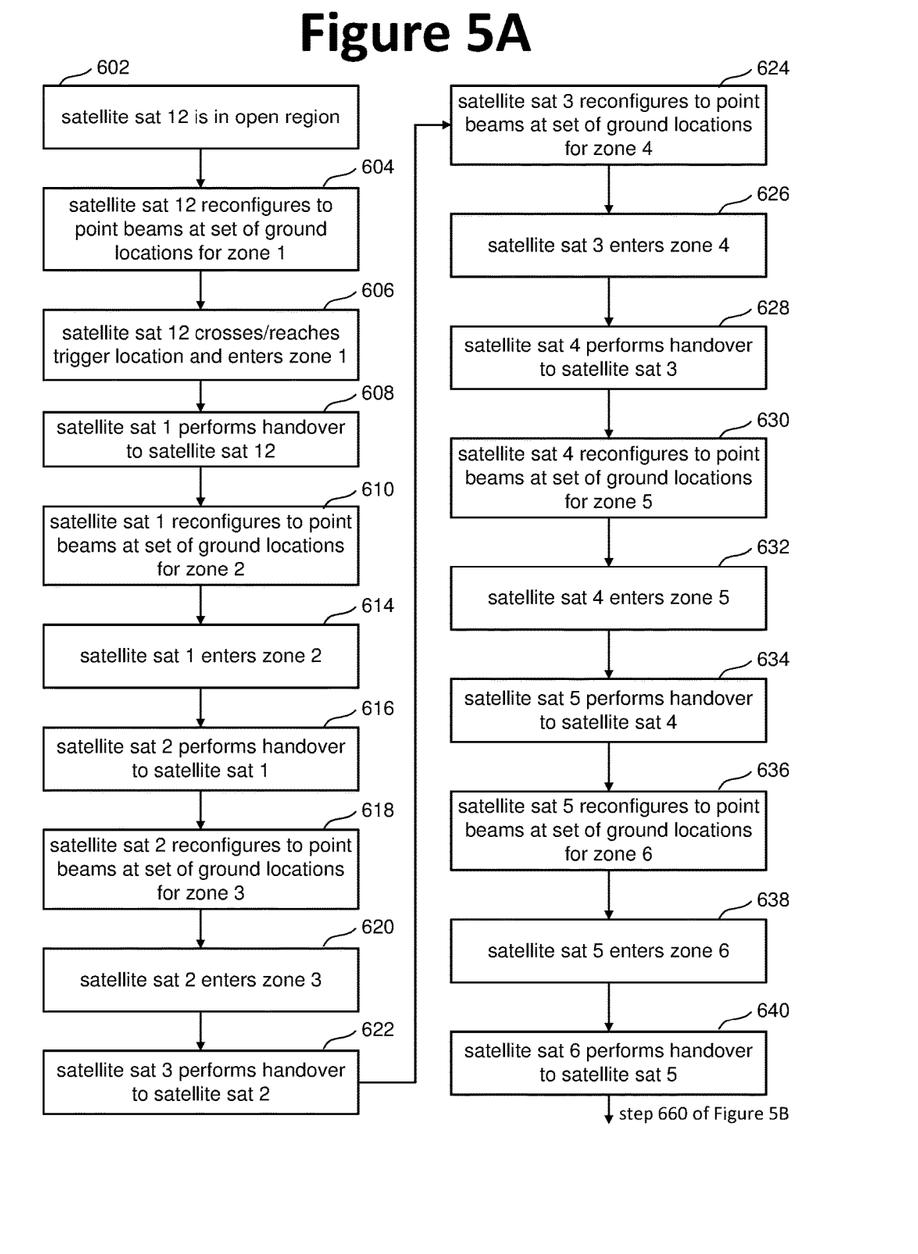
FIGS. 5A and 5B together are a flow chart describing one embodiment for implementing a rolling wave of handovers between satellites.
Figure 5B:
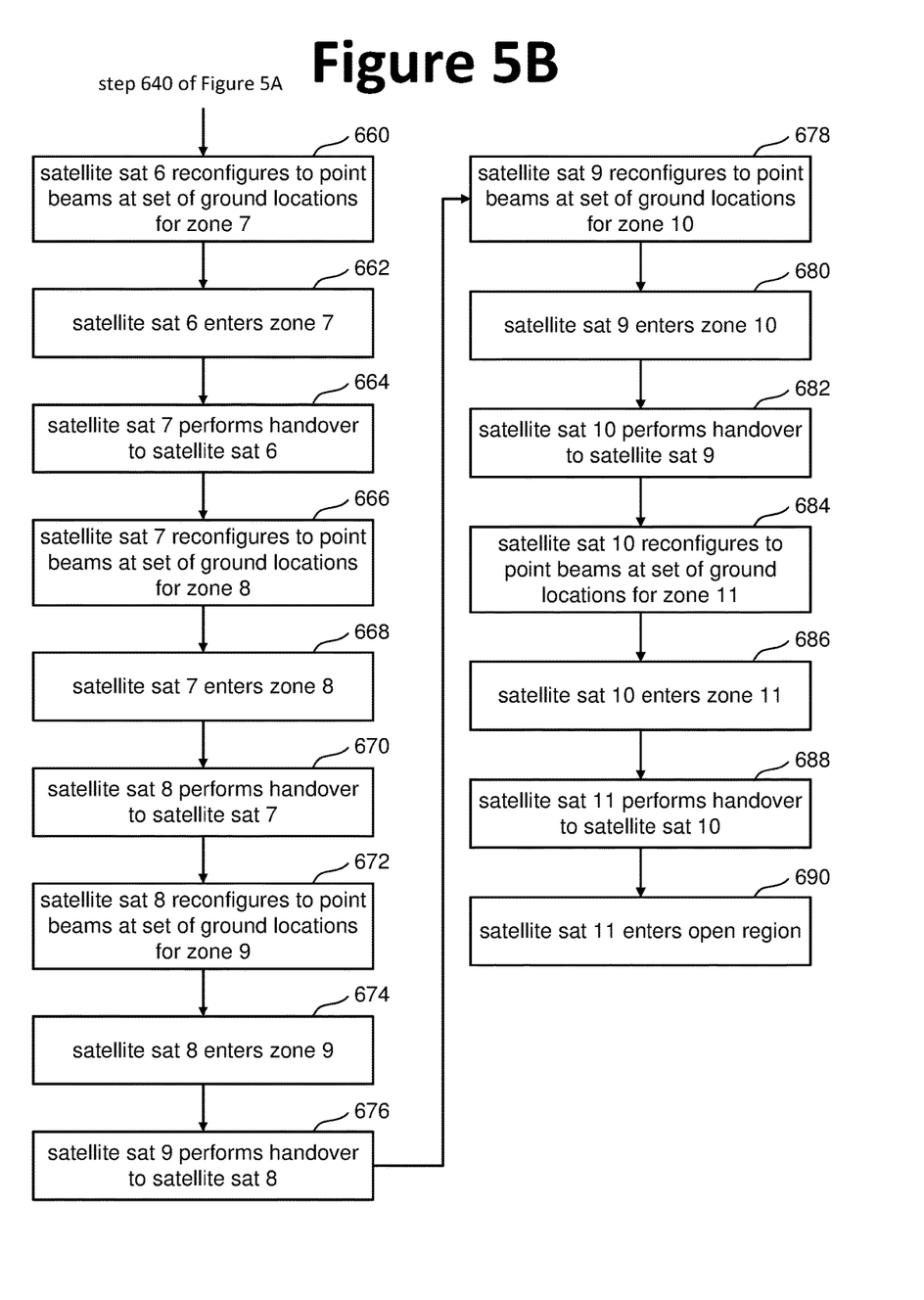

FIGS. 5A and 5B together are a flowchart describing more details of one example implementation of the rolling wave of handovers between satellites discussed in FIG. 4. The process of FIGS. 5A and 5B contemplates that a non-geosynchronous satellite will be configured to concurrently handover all of its beams of a group of dependent beams (or all of the beams on the satellite) to a trailing adjacent satellite and subsequently reconfigure pointing of its group of dependent beams. The non-geosynchronous satellite is also configured to concurrently receive handover of beams for the group of dependent beams from a leading adjacent satellite after reconfiguring the pointing of the group of dependent beams. In one embodiment, all of the beams are steerable spot beams. In the example of FIGS. 5A and 5B, the rolling wave of handovers starts with satellite sat 12. Satellite sat 12 is being used as an example. The process will be performed for each satellite of the constellation. That is, every time any of the satellites passes the western edge of zone 1, a new rolling wave will start; therefore, a rolling wave will start from each of the satellites at different times.

In step 602 of FIG. 5A, satellite sat 12 is in the open region. In step 604, satellite sat 12 reconfigures to point its steerable beams at the set of ground locations associated with zone 1. In step 606, satellite sat 12 reaches and/or crosses the trigger location and enters zone 1. This will trigger the start of a new wave of rolling handovers. In step 608, satellite sat 1 performs a handover of its beams to satellite sat 12. In step 610, satellite sat 1 reconfigures its beams to point the beams at the set of ground locations associated with zone 2. In step 614, satellite sat 1 enters zone 2. In step 616, satellite sat 2 performs a handover of its beams to satellite sat 1. In step 618, satellite sat 2 reconfigures its beams to point its beams at the set of ground locations associated with zone 3. In step 620, satellite sat 2 enters zone 3. In step 622, satellite sat 3 performs a handover of its beams to satellite sat 2. In step 624, satellite sat 3 reconfigures its beams to point its beams at the set of ground locations associated with zone 4. In step 626, satellite sat 3 enters zone 4. In step 628, satellite sat 4 performs a handover of its beams to satellite sat 3. In step 630, satellite sat 4 reconfigures to point its beams at the set of the ground locations associated with zone 5. In step 632, satellite sat 4 enters zone 5. In step 634, satellite sat 5 performs a handover of its beams to satellite sat 4. In step 636, satellite sat 5 reconfigures its beams to point its beams at the set of ground locations associated with zone 6. In step 638, satellite sat 5 enters zone 6. In step 640, satellite sat 6 performs a handover of its beams to satellite sat 5.

After step 640, the process continues at step 660 of FIG. 5B, in which satellite 6 reconfigures its beams to point its beams at the set of ground locations associated with zone 7. In step 662, satellite sat 6 enters zone 7. In step 664, satellite sat 7 performs a handover of its beams to satellite sat 6. In step 666, satellite sat 7 reconfigures to point its beams at the set of ground locations associated with zone 8. In step 668, satellite sat 7 enters zone 8. In step 670, satellite sat 8 performs a handover of its beams to satellite sat 7. In step 672, satellite sat 8 reconfigures its beams to point its beams at the set of ground locations associated with zone 9. In step 674, satellite 8 enters zone 9. In step 676, satellite sat 9 performs a handover of its beams to satellite sat 8. In step 678, satellite sat 9 reconfigures its beams to point its beams at the set of ground locations associated with zone 10. In step 680, satellite sat 9 enters zone 10. In step 682, satellite sat 10 performs a handover of its beams to satellite sat 9. In step 684, satellite 10 reconfigures its beams to point its beams at the set of ground locations associated with zone 11. In step 686, satellite sat 10 enters zone 11. In step 688, satellite sat 11 performs a handover of its beams to satellite sat 10. In step 690, satellite sat 11 enters the open region. After entering the open region, satellite sat 11 will come to the eastern edge of open region, which is also the western edge of zone 1, and then the process of FIG. 5A will begin with satellite 11 reconfiguring to point its beams at the set of ground of locations associated with zone 1 (see step 604). Thus, the process of FIG. 5A-5B is continuously repeated.

The process of FIGS. 5A and 5B include three steps that are repeated by sequential adjacent pairs of satellites. These three steps include a trailing satellite reconfiguring its beams to point them at the next zone, the trailing satellite crossing into the next zone, and the leading satellite handing over its beams to the trailing satellite. For example, these three steps are set out in FIGS. 5A/5B as 604/606/608, 610/614/616, 618/620/622, 624/626/628, 630/632/634, 636/638/640, 660/662/664, 666/668/670, 672/674/676, 678/680/682, 684/686/688. These sets of three steps will be explained in more detail with respect to FIGS. 6A, 6B and 6C in conjunction with the flowchart of FIG. 7.

Figure 7:
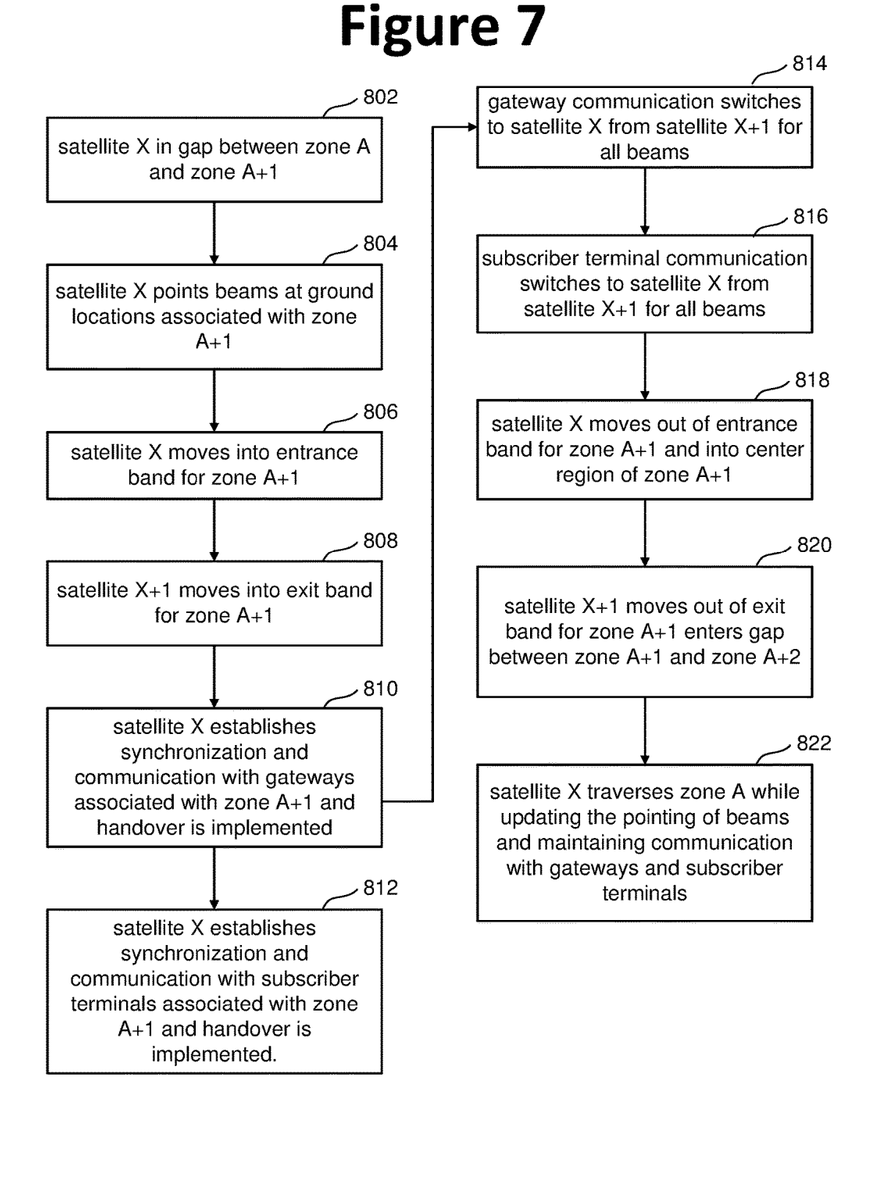
FIG. 7 is a flow chart describing one embodiment of a process for handing over beams between two adjacent satellites.

In step 802 of FIG. 7, a satellite is in the gap between two zones. For example, satellite X is in the gap between zone A and zone A+1. Note that satellite X represents any one of the satellites in the constellation. Zones A and A+1 are any pair of adjacent zones. In step 804, satellite X points its beams at the ground locations associated with zone A+1. Thus, steps 802 and 804 of FIG. 7 represent the first of the three steps of the process of FIGS. 5A and 5B. That is, steps 802 and 804 of FIG. 7 are an example implementation of steps 604, 610, 618, 624, 630, 636, 660, 666, 672, 678 and 684.

Figure 6A:
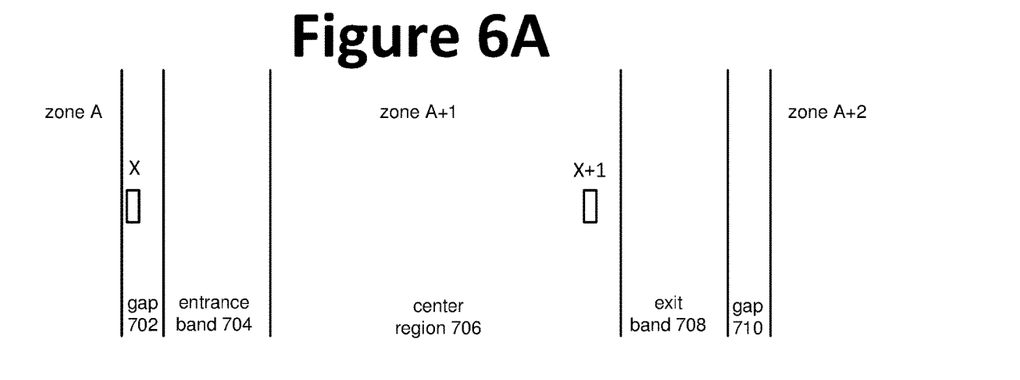
FIGS. 6A, 6B and 6C depicts three zones and a portion of a rolling wave of handovers between satellites.

FIG. 6A depicts the location of the satellites during steps 802 and 804. More specifically, FIG. 6A depicts zone A, zone A+1 and zone A+2. Between the zone A and zone A+1 is gap 702. Between zone A+1 and zone A+2 is gap 710. Zone A+1 includes entrance band 704, center region 706 and exit band 708. In one embodiment, the width of entrance band 704 and exit band 708 represents a distance of travel in longitude during the handover period, plus any slewing/repointing time required for the steerable beams (which may be physically or electronically steered). FIG. 6A depicts satellite X in gap 702 and satellite X+1 in center region 706 of zone A+1.

Figure 6B:
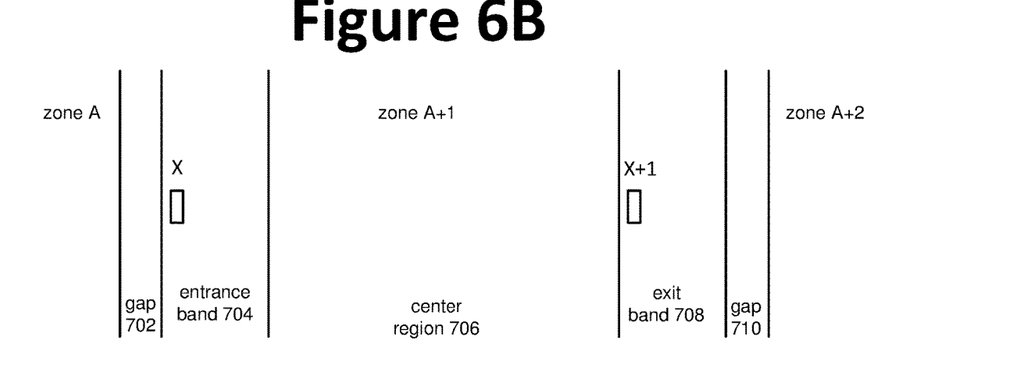

In step 806 of FIG. 7, satellite X moves into the entrance band 704 for zone A+1. In step 808, satellite X+1 moves into the exit band 708 for zone A+1. The handover of beams will occur while satellite X is in the entrance band 704 and satellite X+1 is in exit band. FIG. 6B depicts the location of the satellites after steps 806 and 808, with satellite X in entrance band 704 for zone A+1 and satellite X+1 in exit band 708 for zone A+1. Steps 806 and 808 are an example implementation of steps 606, 614, 620, 626, 632, 638, 662, 668, 674, 680 and 686.

In step 810, satellite X establishes synchronization and communication with the gateways in the ground locations associated with zone A+1. In step 812, satellite X establishes synchronization and communication with the subscriber terminals in the ground locations associated with zone A+1. In one embodiment, steps 810 and 812 are performed concurrently with each other. In step 814, gateway communication switches to satellite X from satellite X+1 for all beams. In step 816, subscriber terminal communication switches to satellite X from satellite X+1 for all beams. In one embodiment, steps 814 and 816 are performed concurrently with each other. In one embodiment, steps 810-816 are performed for all spot beams of satellite X+1 and satellite X. In another embodiment, steps 810-816 are performed for all spot beams of a group of dependent spot beams for satellite X+1 and satellite X. In another embodiment steps 810-816 are performed for all steerable spot beams for satellite X+1 and satellite X. Thus, steps 810-816 include satellite X+1 concurrently handing over all of its beams (or all of the beams of a group of dependent beams) to satellite X while satellite X and satellite X+1 are in zone A+1. In one embodiment, steps 810-816 are performed while satellite X is in entrance band 704 of zone A+1 and satellite X+1 is in exit band 708 of zone A+1, as depicted in FIG. 6B. Steps 810-816 are an example implementation of steps 608, 616, 622, 628, 634, 640, 664, 670, 676, 682, and 688.

Figure 6C:
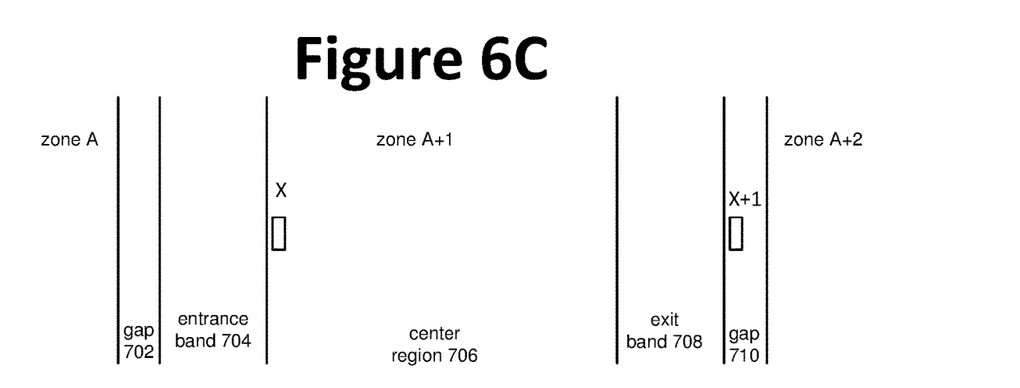

In step 818, satellite X moves out of the entrance band 704 for zone A+1 and into the center region 706 of zone A+1. In step 820, satellite X+1 moves out of the exit band 708 for zone A+1 and enters gap 710 between zone A+1 and zone A+2. FIG. 6C shows the locations of satellite X in center region 706 and satellite X+1 in gap 710, after step 818 and 820. In step 822, satellite X traverses center region 706 of zone A+1, while updating the pointing of its beams to continue to point at the locations associated with zone A+1 and maintain communication with the gateways and subscriber terminals of zone A+1.

Figure 8:
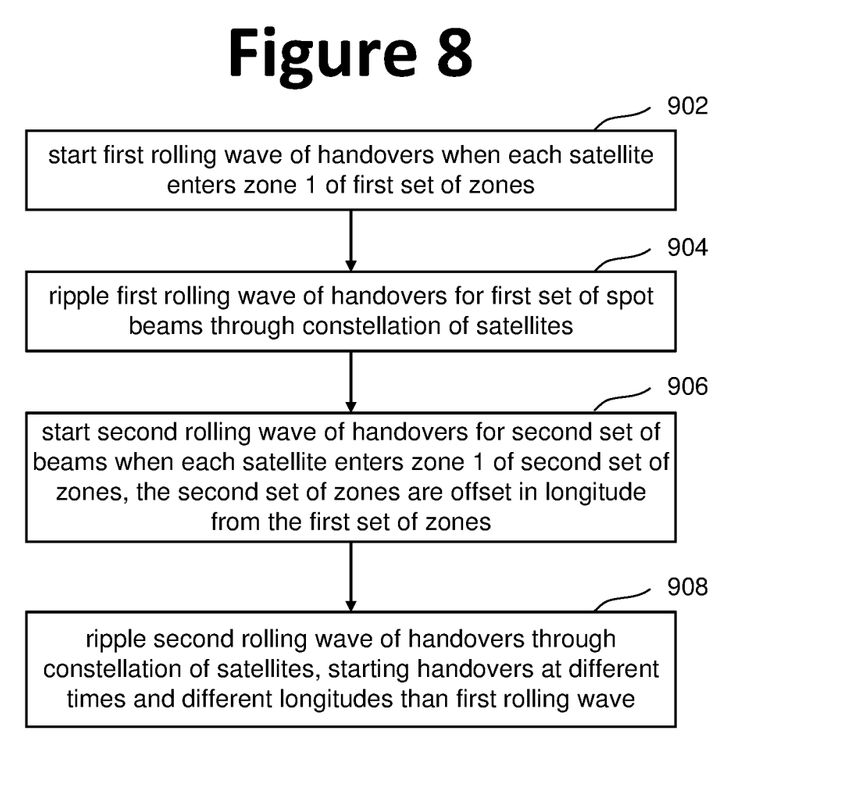
FIG. 8 is a flow chart describing one embodiment of a process for implementing multiple rolling waves of handovers between satellites.

In one embodiment, it is possible to have more than one rolling wave of handovers rippling through the constellation of satellites. For example, each of the satellites can have multiple groups of dependent beams. Each group of dependent beams could have its own rolling wave of handovers. For example, if there are five groups of dependent beams, there could be five separate rolling waves of handovers. In other embodiments, multiple groups of dependent beams can be handed over at the same time. Thus, a constellation of satellites can have one or more rolling waves of handovers. This process of implementing multiple rolling waves of handovers is described by the flowchart of FIG. 8. In step 902 of FIG. 8, the system (including the constellation of satellites) starts a first rolling wave of handovers when each satellite enters zone 1 of the first set of zones. That is, every time one of the satellites enters zone 1, a new first wave of rolling handovers starts. This first rolling wave of handovers is rippled across the constellation of satellites (as per FIGS. 5A-5B) for a first set of dependent spot beams in step 904. In one embodiment, for each separate rolling wave of handovers, the system will have a separate set of zones. FIG. 3, described above, depicted one set of zones. A second set of zones can be superimposed on the map, where the second set of zones are at different longitudes than the first set of zones. In step 906, a second rolling wave of handovers is started for a second set of dependent spot beams when each satellite enters zone 1 of the second set of zones, where the second set of zones are offset in longitude from the first set of zones. In step 908, the second rolling wave of handovers is rippled through the constellation of satellites such that the handovers of the second rolling wave of handovers start at different times and different longitudes than the handovers of the first rolling wave of handovers. Therefore the first rolling wave of handovers and the second rolling wave of handovers are performed concurrently, even though they start and end at different times. A wave may ripple through only a portion of the constellation zones before joining another rolling wave. Although FIG. 8 contemplates two rolling waves of handovers, other embodiments can include more than two rolling waves of handovers.

The rolling wave handover approach proposes that handovers of a set of beams rolls from one satellite to the next, handing over all beams on one satellite to the next, freeing up one satellite's resources for handover to the next satellite. The rolling wave propagates around the orbit such that when the next satellite crosses the same ground location where the first wave started, the next wave starts the process again. In one embodiment, N−1 zones are created for N satellites in the constellation, such that one satellite is always in handover from one zone to the next.

One embodiment includes a satellite system, comprising: a plurality of satellites adapted to be in a common orbit and to implement handovers of beams between adjacent satellites in sequence for pairs of adjacent satellites in a single direction around the orbit.

One embodiment includes a method of operating a satellite system, comprising: orbiting a plurality of non-geosynchronous satellites in a common orbit; and each time one of the satellites is at a trigger location, starting a new rolling wave of handovers that includes performing handovers of a group of dependent spot beams between adjacent satellites in sequence for pairs of adjacent satellites in a single direction around the orbit.

One embodiment includes a satellite system, comprising: a non-geosynchronous satellite configured to concurrently handover all of its beams of a group of dependent beams to a trailing adjacent satellite and subsequently reconfigure pointing of the group of dependent beams, the non-geosynchronous satellite is configured to concurrently receive handover of beams for the group of dependent beams from a leading adjacent satellite after reconfiguring the pointing of the group of dependent beams.

One embodiment includes a satellite system, comprising: a first satellite configured to travel in an orbit that is divided into zones with gaps between the zones, the first satellite is configured to travel in a gap between zone A and zone A+1, the first satellite is configured to point all of its beams of a group of beams at ground locations associated with zone A+1; and a second satellite configured to travel in the orbit, the first satellite is configured to move into zone A+1 while the second satellite is in zone A+1, the second satellite is configured to concurrently hand over all beams of its group of beams to the first satellite while the first satellite and the second satellite are in zone A+1, the second satellite is configured to move out of zone A+1 into a gap between zone A+1 and zone A+2, the first satellite is configured to update pointing of its beams of the group of beams while the first satellite traverses zone A+1 and maintains communication with ground terminals using its beams of the group.

One embodiment includes a method of operating a satellite system that includes a plurality of satellites including a first satellite and a second satellite in a common orbit that is divided into zones with gaps between the zones, the method comprising: the first satellite traveling in a gap between zone A and zone A+1; the first satellite pointing all of its beams of a group of beams at ground locations associated with zone A+1 while traveling in the gap between zone A and zone A+1; the first satellite moving into zone A+1 while the second satellite is in zone A+1; the second satellite concurrently handing over all beams of the group of beams to the first satellite while the first satellite and the second satellite are in zone A+1; the second satellite moving out of zone A+1 into a gap between zone A+1 and zone A+2; and the first satellite updating pointing of its beams of the group of beams while the first satellite traverses zone A+1 and maintains communication with ground terminals using its beams of the group.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite system, comprising:
a plurality of satellites consisting of N satellites, each satellite including a plurality of steerable beams, the plurality of satellites adapted to be in a common orbit and to implement handovers of steerable beams between adjacent satellites in sequence for pairs of adjacent satellites in a single direction around the common orbit, the common orbit divided into N−1 zones, each zone associated with a set of ground locations, a handover of beams between adjacent satellites including concurrent handover of all steerable beams of a zone between the adjacent satellites;
the satellites are non-geosynchronous satellites;
the plurality of satellites are configured such that each time one of the satellites is at a first trigger location, a new first rolling wave of handovers is started that includes performing handovers of a first group of dependent spot beams between adjacent satellites in sequence for pairs of adjacent satellites in the single direction around the common orbit; and
the plurality of satellites are configured such that each time one of the satellites is at a second trigger location, a new second rolling wave of handovers is started that includes performing handovers of a second group of dependent spot beams between adjacent satellites in sequence for pairs of adjacent satellites in the single direction around the common orbit.

2. A satellite system according to claim 1, wherein:
the handovers of beams include handovers of all communication beams together per satellite.

3. A satellite system according to claim 1, wherein:
the N satellites and the N−1 zones are configured such that at a given time, N−1 satellites are in one-to-one correspondence with the N−1 zones and a remaining satellite is in handover from one zone to another.

4. A satellite system according to claim 1, wherein:
each satellite includes at least one of a motor for mechanical steering of the plurality of steerable beams and a phased array for electrical steering of the plurality of steerable beams.

5. A satellite system according to claim 1, wherein:
the plurality of satellites are configured such that each time one of the satellites is at a trigger location at an entrance band of a zone, a new rolling wave of handovers is started that includes performing handovers of a group of dependent spot beams between adjacent satellites in sequence for pairs of adjacent satellites in the single direction around the common orbit.

6. A satellite system according to claim 1, wherein:
the plurality of satellites include a first satellite and a second satellite;
the common orbit includes gaps between the zones;
the first satellite is configured to point all of its beams of a group of beams at ground locations associated with zone A+1;

the first satellite is configured to move into zone A+1 from a gap between zone A and zone A+1 while the second satellite is in zone A+1;

the second satellite is configured to concurrently hand over all beams of its group of beams to the first satellite while the first satellite and the second satellite are in zone A+1;

the second satellite is configured to move out of zone A+1 into a gap between zone A+1 and zone A+2; and the first satellite is configured to update pointing of its beams of the group of beams while the first satellite traverses zone A+1 and maintains communication with ground terminals using its beams of the group.

7. A satellite system according to claim 1, wherein:

the plurality of satellites include a first satellite and a second satellite;

the common orbit includes gaps between the zones;

the first satellite is configured to point all of its beams of a group of beams at ground locations associated with zone A+1 while traveling in a gap between zone A and zone A+1;

the first satellite is configured to be in an entrance band of zone A+1 while the second satellite is in an exit band of zone A+1;

the second satellite is configured to concurrently hand over all beams of its group of beams to the first satellite while the first satellite is in the entrance band of zone A+1 and the second satellite is in the exit band of zone A+1;

the second satellite is configured to move out of zone A+1 into a gap between zone A+1 and zone A+2; and the first satellite is configured to update pointing of its beams of the group of beams while the first satellite traverses zone A+1 and maintains communication with ground terminals using its beams of the group.

8. A satellite system according to claim 1, wherein:

the plurality of satellites are configured such that each time one of the satellites is at a boundary of a first zone, a new rolling wave of handovers is started.

9. A method of operating a satellite system, comprising:

orbiting a plurality of non-geosynchronous satellites consisting of N satellites in a common orbit, the common orbit including N−1 zones;

N−1 satellites of the plurality of satellites maintaining communication with ground locations of the N−1 zones with an individual satellite of the N−1 satellites maintaining communication with ground locations of a zone in which it is located, a remaining satellite of the plurality of satellites in handover at a given time; and each time one of the plurality of satellites is at a trigger location, starting a new rolling wave of handovers that includes performing handovers of a group of dependent spot beams between adjacent satellites in sequence for pairs of adjacent satellites in a single direction around the common orbit, including:

performing a first handover from a second satellite to a first satellite at a first time, the first handover including concurrent handover of all steerable beams of the second satellite to the first satellite;

subsequently, performing a second handover from a third satellite to the second satellite at a second time, the second handover including concurrent handover of all steerable beams of the third satellite to the second satellite; and subsequently, performing a third handover from a fourth satellite to the third satellite at a third time, the third handover including concurrent handover of all steerable beams of the fourth satellite to the third satellite.

10. A method according to claim 9, wherein:

each time one of the satellites is at a boundary of a first zone, the new rolling wave of handovers is started.

11. A method according to claim 9, wherein:

each satellite includes only steerable beams; and the handovers include concurrent handovers of all steerable beams per satellite.

12. A method according to claim 9, wherein:

the plurality of satellites includes a first satellite and a second satellite;

the common orbit includes gaps between the zones;

the performing handovers comprises:

the first satellite traveling in a gap between zone A and zone A+1, the first satellite pointing all of its beams of a group of beams at ground locations associated with zone A+1 while traveling in the gap between zone A and zone A+1, the first satellite traveling in a gap between zone A and zone A+1, the second satellite concurrently handing over all beams of the group of beams to the first satellite while the first satellite and the second satellite are in zone A+1, the second satellite moving out of zone A+1 into a gap between zone A+1 and zone A+2, and the first satellite updating pointing of its beams of the group while the first satellite traverses zone A+1 and maintains communication with ground terminals using its beams of the group.

13. A method according to claim 9, further comprising:

each time one of the satellites is at a second location, a new second rolling wave of handovers is started that includes performing handovers of a different group of dependent spot beams between adjacent satellites in sequence for pairs of adjacent satellites in the single direction around the common orbit.

14. A satellite system, comprising:

a non-geosynchronous satellite having steerable beams that are steerable by mechanically or electrically steerable antennas, the non-geosynchronous satellite configured to concurrently handover all of its steerable beams to a trailing adjacent satellite and subsequently reconfigure pointing of steerable antennas of the steerable beams, the non-geosynchronous satellite is configured to concurrently receive handover of all steerable beams from a leading adjacent satellite after reconfiguring the pointing of the steerable antennas of the steerable beams; and the non-geosynchronous satellite is configured to follow an orbit that is divided into zones, each zone associated with a set of ground locations, and to concurrently handover all of its steerable beams to the trailing adjacent satellite when the non-geosynchronous satellite is located in a first zone and to concurrently receive handover of all steerable beams from the leading adjacent satellite when the non-geosynchronous satellite is in a second zone that is separated from the first zone by a gap.

15. A satellite system according to claim 14, wherein:

the satellite is configured to participate in a rolling wave of handovers of beams between adjacent satellites in sequence for pairs of adjacent satellites in a single direction around a common orbit.

16. A satellite system according to claim 14, wherein:
the non-geosynchronous satellite, the trailing adjacent satellite and the leading adjacent satellite travel on a common orbit;
the common orbit is divided into zones with gaps between the zones;
the non-geosynchronous satellite is configured to point all of its steerable beams at ground locations associated with zone A+1 while traveling in a gap between zone A and zone A+1;
the non-geosynchronous satellite is configured to move into zone A+1 while the leading adjacent satellite is in zone A+1;
the non-geosynchronous satellite is configured to receive handover of all steerable beams from the leading adjacent satellite while the non-geosynchronous satellite and the leading adjacent satellite are in zone A+1; and
the non-geosynchronous satellite is configured to update pointing of all steerable beams while the non-geosynchronous satellite traverses zone A+1 and maintains communication with ground terminals using its beams of the group.

17. A satellite system, comprising:
a plurality of satellites consisting of N satellites, each satellite including a plurality of steerable beams, the plurality of satellites adapted to be in a common orbit and to implement handovers of steerable beams between adjacent satellites in sequence for pairs of adjacent satellites in a single direction around the common orbit, the common orbit divided into N−1 zones with gaps between zones, each zone associated with a set of ground locations;
a first satellite configured to travel in the common orbit, the first satellite is configured to travel in a gap between zone A and zone A+1, the first satellite is configured to point all of its steerable beams at ground locations associated with zone A+1; and
a second satellite configured to travel in the common orbit, the first satellite is configured to move into zone A+1 while the second satellite is in zone A+1, the second satellite is configured to concurrently hand over all of its steerable beams to the first satellite while the first satellite and the second satellite are in zone A+1, the second satellite is configured to move out of zone A+1 into a gap between zone A+1 and zone A+2, the first satellite is configured to update pointing of its steerable beams while the first satellite traverses zone A+1 and maintains communication with ground terminals using its beams of the group.

18. A satellite system according to claim 17, wherein:
each satellite includes at least one of a motor for mechanical steering of the plurality of steerable beams and a phased array for electrical steering of the plurality of steerable beams.

19. A method of operating a satellite system that includes a plurality of satellites having steerable beams that are steerable by steerable antennas, the plurality of satellites including a first satellite and a second satellite of N satellites in a common orbit that is divided into N−1 zones with gaps between the zones, the method comprising:
implementing handovers of all steerable beams of a zone between adjacent satellites in sequence for pairs of adjacent satellites in a single direction around the common orbit, wherein a handover between the first satellite and the second satellite includes:
the first satellite traveling in a gap between zone A and zone A+1;
the first satellite pointing all of its steerable beams at ground locations associated with zone A+1 while traveling in the gap between zone A and zone A+1;
the first satellite moving into zone A+1 while the second satellite is in zone A+1 and while the second satellite maintains communication with the ground locations associated with zone A+1;
the second satellite concurrently handing over all of its steerable beams to the first satellite while the first satellite and the second satellite are in zone A+1;
subsequently, the second satellite moving out of zone A+1 into a gap between zone A+1 and zone A+2;
subsequently, the second satellite travelling in a gap between zone A+1 and zone A+2;
the second satellite pointing all of its steerable beams at ground locations associated with zone A+2 while travelling in the gap between zone A and zone A+1; and
the first satellite updating pointing of its steerable beams of the group of beams while the first satellite traverses zone A+1 and maintains communication with ground terminals using its beams of the group.

* * * * *